United States Patent Office 3,439,153
Patented Apr. 15, 1969

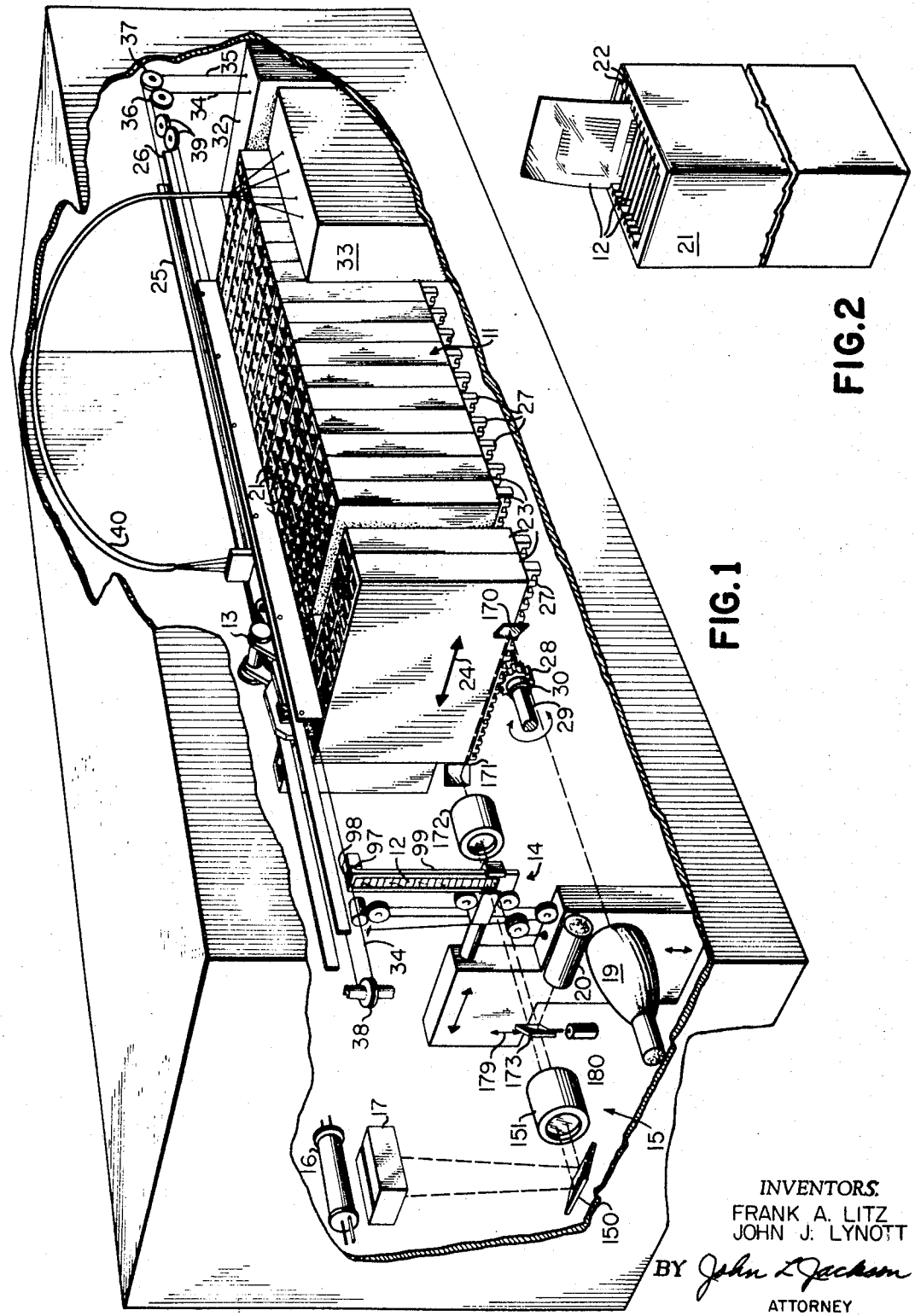

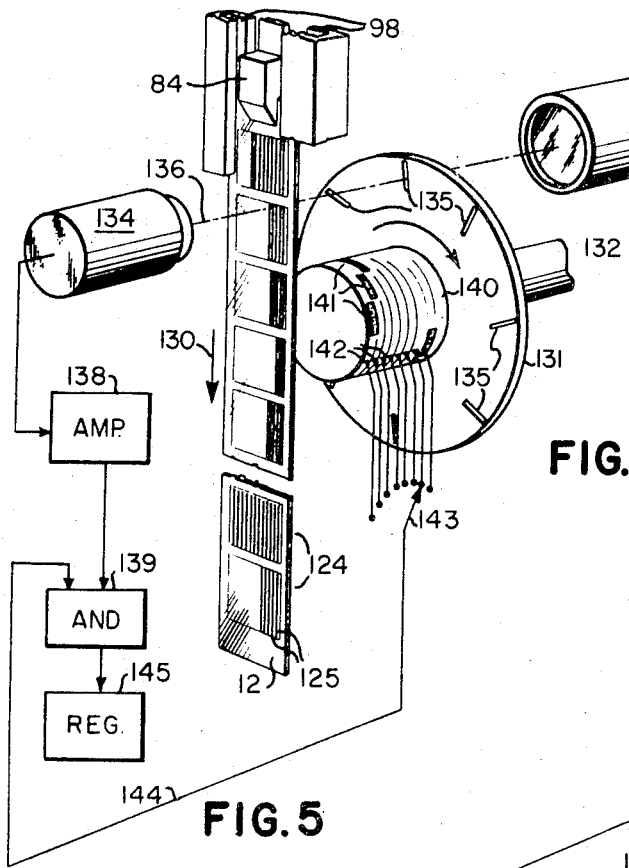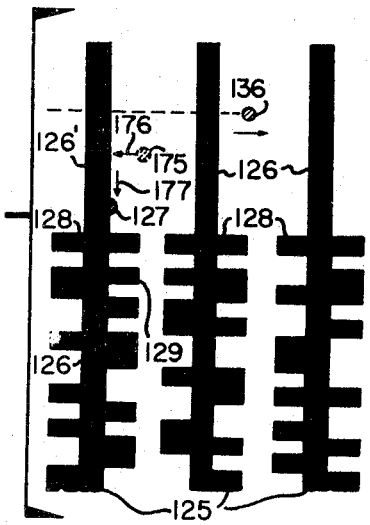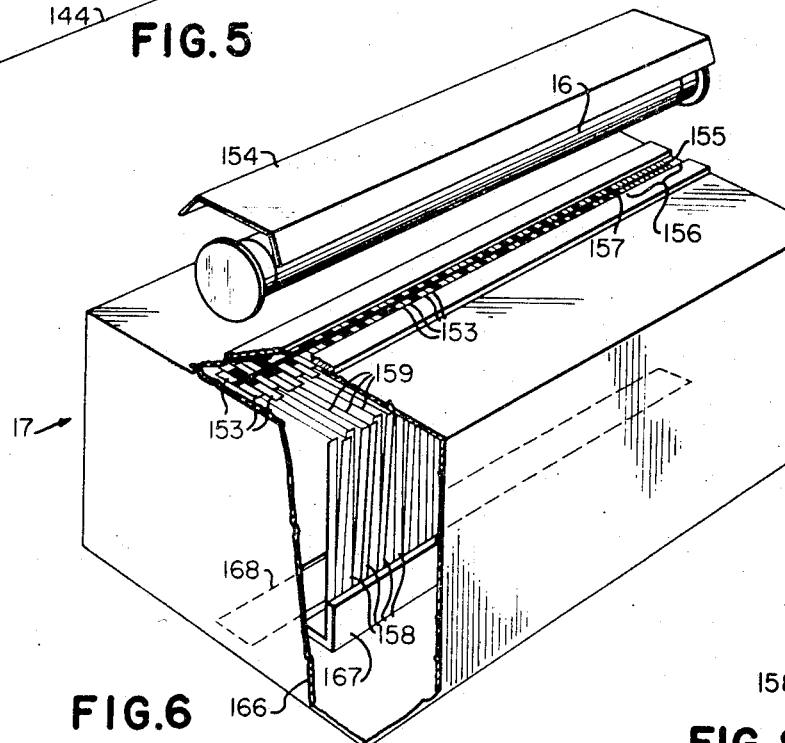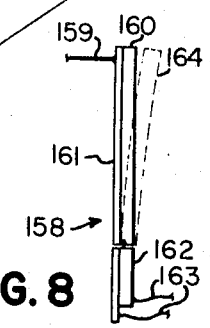

3,439,153
OPTICAL DATA LINE COUNTER
Frank A. Litz, San Jose, and John J. Lynott, Los Gatos, Calif., assignors to International Business Machines Corporation, New York, N.Y., a corporation of New York
Original application Jan. 12, 1959, Ser. No. 786,406, now Patent No. 3,149,529, dated Sept. 22, 1964. Divided and this application July 16, 1964, Ser. No. 383,059
Int. Cl. G06k 7/00; G01n 21/30
U.S. Cl. 235—61.11
3 Claims

ABSTRACT OF THE DISCLOSURE

A system for counting the number of lines previously optically recorded in a preselected frame on a length of film which includes a slotted disk which is rotated in synchronism with the movement of the length of film through an optical station to cause a beam of light to scan across the optically recorded lines in each frame. A photocell is in optical association with the beam of light which is modulated by the optical lines and a gating means is provided which can be set such that pulses from the photocell will be passed during the scanning of only a selected one of the frames.

---

This invention relates to data storage systems wherein data is recorded optically upon a plurality of record sheets such as film strips in lines, a number of which comprise a sector, in general, and more particularly to a means for counting both the previously recorded lines and sectors.

This application is a division of an application entitled "Direct Access Photo Memory," Ser. No. 786,406, filed Jan. 12, 1959, now Patent No. 3,149,529.

It is an object of the present invention to provide an improved read/write station for receiving a film strip from a transport carriage and for positioning the film strip in an optical system such that data may be reproduced from a final line of a particular section of the film strip which may include any number of such lines up to a predetermined maximum, or alternatively wherein data may be recorded upon the film strip in a line immediately following the final line of such data which had been previously recorded.

Other objects of the invention will be pointed out in the following description and claims and illustrated in the accompanying drawings which disclose, by way of example, the principle of the invention and a particular mode which has been contemplated of applying that principle.

In the drawings:

FIG. 1 is a perspective view of the data storage machine of this invention with portions of the cover broken away to reveal the arrangement of the various working elements therein.

FIG. 2 is an enlarged perspective view of a single cell or bin suitable for use in the storage file of the machine in FIG. 1 and adapted to hold a plurality of record sheets such as film strips.

FIG. 5 is a schematic view showing the arrangement of elements with an electrical circuit for determining the number of lines of data previously recorded upon a selected sector or portion of a selected film strip.

FIG. 6 is an enlarged perspective view with parts broken away of a shutter matrix apparatus for generating an optical image representative of data to be stored.

FIG. 7 is a greatly enlarged view of the starting ends of several lines of data as it would be stored and sensed in accordance with this invention.

FIG. 8 is an enlarged elevational view of a single electrostrictive element of the type used to position the shutters as shown in FIG. 6.

Figure 3:
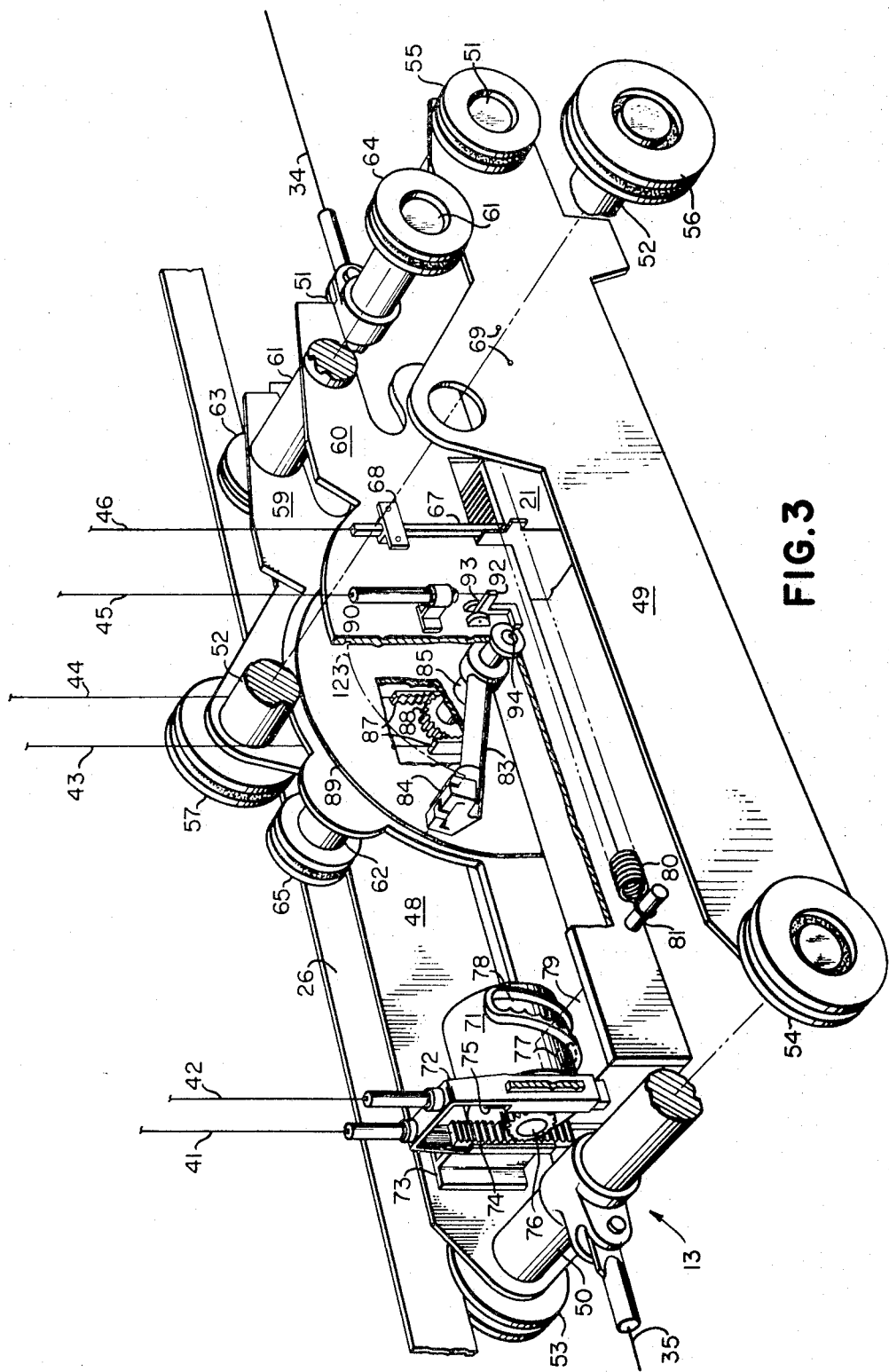
FIG. 3 is an enlarged perspective view of a transport carriage for selectively removing and transporting film strips from the various cells to a read/write station; the transport carriage is shown with parts exploded away and other parts removed or broken away to reveal the underlying structure.

Briefly stated, the data storage machine of this invention as shown generally in FIG. 1, includes a storage file 11 containing many film strips 12 (FIG. 2) which constitute record sheets, a transport carriage 13 for selectively removing and transporting film strips to a read/write station 14. Information may be recorded upon the film strips by a first optical system 15 which focuses an image produced from a source of ultraviolet radiation 16 and a shutter matrix arrangement 17 upon the film strips 12 in the read/write station 14. The data may be reproduced from the film strip 12 by a second optical system 18 including means such as a cathode ray tube 19 for producing a scanning spot of light which is focused upon the film strip, passes therethrough and is sensed by a photocell 20.

Record storage and selection

As heretofore indicated, the data is stored photographically on film strips 12. As shown in FIG. 2, a plurality of series of film strips 12 are contained in a bin or cell 21 which is formed with opposed sides having slots or guideways 22 dimensioned to receive the film strips 12. Because each individual film strip may be positioned or seated within its own guideway 22, there is no physical contact between the adjacent film strips, and therefore, the adjacent film strips will not stick or bind together. Thus, a single film strip 12 may be selected and withdrawn from the cell 21 as shown in FIG. 2 without causing any other adjacent strips to rise with the selected one. Another advantage gained in providing separate slots 22 for each film strip 12 lies in the fact that the film strips will not have physical contact with anything except at their edges or peripheral portions; and therefore, a photographic emulsion on the surface thereof will not be scratched or otherwise damaged.

As shown in FIG. 1, various identically dimensioned cells may be removably positioned within further bins or drawers 23. Each drawer 23 is mounted to slide or move transversely of the machine and of the normal motion of the transport carriage 13 as indicated by an arrow 24. The transport carriage 13 is mounted to move longitudinally of the machine on a pair of rails 25 and 26 which extend from the read/write station 14 at one end to positions over all of the various drawers 23. By selectively positioning the transport carriage 13 over a particular drawer, and by removing the drawer transversely to a selected position, the transport carriage may be located over any particular one of the many cells 21 in the storage file 11.

A selective drawer driving means includes a rack 27 attached to each of the drawers 23 and a plurality of drive pinions 28 loosely mounted upon a drive shaft 29. A magnetic clutch 30 is attached to each of the pinions 28 and is mounted on the shaft 29 such that any selected pinion 28 may be mechanically coupled to be moved by the shaft 29. For the sake of clarity, only a single pinion 28 and clutch 30 is shown in FIG. 1 of the drawing, but it is obvious that each of the drawers 23 may have associated therewith a similar pinion and clutch. As shown in FIG. 1, the third drawer has been driven rearwardly to present a particular cell 21 in spaced relation with the transport means 13. An obvious extension of this invention would be to provide lateral movement of all of the drawers as a single body, thereby eliminating the separate racks 27, pinions 28 and clutches 30. However, the present arrangement permits faster access time by movement of but one drawer with a minimum amount of power expenditure and vibration by materially reducing the moving mass, and further permits a multiple access arrangement from the same storage file 11 by use of additional transport carriages and read/write stations.

The transport carriage 13 is movable along the rails 25 and 26, and includes several movable and/or positionable parts carried thereon. The drive mechanisms associated with the transport carriage 13 are of known character, and are shown in FIG. 1 as simple boxes 32 and 33. These mechanisms 32 and 33 may be of a hydraulic piston type arrangement such that fluid under pressure may drive various pistons between preset limits by the selective operation of solenoid valves. One such hydraulic positioning device may include tandemly coupled piston-cylinders for producing movements of selective increments, and will be discussed subsequently in connection with the read/write station. The drive mechanism 32 is mechanically coupled to move the transport carriage 13 along the rails 25 and 26 by a pair of drive cables or wires 34 and 35 trained around a pair of pulleys 36 and 37 at one end and about a further pulley 38 at the other end. The wires 34 and 35 connect to opposite ends of the transport carriage 13 and therefore form a loop which closes with the positioning device 32. A pair of idler pulleys 39 may be included to provide a tightening adjustment for the wires 34 and 35.

The various parts which must move within the transport carriage 13 are mechanically coupled to positioning drive arrangement 33 by Bowden type tube and wire motion transfer devices which may be bundled into a single cable 40. FIG. 3 illustrates the structure and operation of the transport carriage 13, but for clarification, the several drive wires 41 through 46 are shown extending upwardly and separated from each other. The transport carriage 13 comprises generally an outer carriage movable along the rails 25 and 26 and an inner carriage movable and positionable longitudinally with respect to the outer carriage. The outer carriage functions to select a particular cell 21 and to lock or "cage" thereupon; and, the inner carriage may then move to select a particular film strip 12 from the selected cell.

As shown in FIG. 3, the outer carriage comprises a pair of spaced apart supporting plates 48 and 49 rotatably supported by three axles 50, 51 and 52 which are in turn carried by flanged wheels 53 through 57. In order to show the inner parts of the transport carriage 13 the supporting plate 49 has been exploded away together with the flange wheels 54, 55 and 56 and the rail 25 which extends along the front side of the carriage as shown in FIG. 3, has been removed. The rail 25, when assembled with the carriage 13, would pass over the wheels 54 and 55 and under the wheel 56 which is disposed at an intermediate position between the end wheels 54 and 55. Likewise, the rail 26 on the far side of the carriage as viewed in FIG. 3, passes over the end wheel 53 and another end wheel mounted on the axle 51, not visible in FIG. 3, and passes under the wheel 57 which is disposed between the two end wheels. The carriage is therefore mounted to move along the rails 25 and 26 drawn by the cables 34 and 35 which may be attached to the axles 50 and 51 respectively.

The inner carriage comprises a pair of spaced apart plates 59 and 60 which are supported by axles 61 and 62. The axle 61 is supported by a pair of flanged wheels 63 and 64; and the axle 62 is supported at one end by a flanged wheel 65 and at the other end by another flanged wheel which has been removed to show the underlying structure, but which rolls upon the plate 49. The flanged wheels 63, 64 and 65 are likewise movable along the plates 48 and 49 constituting a part of the outer carriage and further constituting supporting rails for movement of the inner carriage.

To permit the inner carriage to move accurately with respect to the selected cell 21 and without regard to any slight error in positioning the outer carriage, a detenting or caging device is provided including a detent pawl 67 which is mounted to slide vertically within a bracket 68. In the assembled structure the bracket 68 is bolted or otherwise fixed to the plate 49 of the outer carriage at mounting holes 69 provided therein. FIG. 3 shows the bracket 68 disassembled from the plate 49 but located at its operable position to move downwardly and cage or detent upon a top edge or rim portion of the selected cell 41. The detent device 67 is operated by the drive cable 46, which in practice may be a Bowden type tube and wire transfer mechanism, such that the actual drive means for the caging device may be located remotely from the transport carriage and not add to the weight thereof.

The drive means for moving the inner carriage with respect to the outer or transport carriage includes the pair of Bowden wires 41 and 42 mechanically coupled to rotate a barrel cam 71 having a plurality of spaced apart flat portions or dwells corresponding in number to the number of film strip positions within the cells 21. As shown in FIG. 3, the Bowden wires 41 and 42 are terminated at a yoke 72 which is fixed to the outer carriage by brackets 73. A pair of opposed spaced racks 74 and 75 are slidably mounted within the yoke 72 and engage the opposite sides of a pinion 76. The pinion 76 is fixed to or formed integrally with the cam 71, and therefore, as the Bowden wires 41 and 42 move oppositely causing similar movement of the racks 74 and 75, the pinion 76 and the cam 71 are rotated. An upwardly extending stud 77 constitutes a cam follower which extends into the spiral raceway 78 of the cam 71. The cam follower 77 is fixed to a transverse member 79 connected between the plates 59 and 60 of the inner carriage, and therefore, as the cam 71 is rotated the cam follower 77 and the entire inner carriage are moved in steps defined by the dwell positions of the cam 71 and corresponding to the film strip positions of the cell 21.

A tension spring 80 is coupled between a stud 81 fixed to the inner carriage and another stud (not shown) fixed to the outer carriage for exerting a force tending to move the inner carriage to the right (as shown in FIG. 3) and thereby to maintain the cam follower 77 in continual contact with one side of the raceway 78 to minimize wear and to eliminate any backlash or "play" in the mechanical linkage. The barrel cam 71 accurately positions the inner carriage with respect to the outer carriage when rotated to a particular dwell position, and since that dwell position may extend over a considerable arc of the cam, considerable tolerance in the accuracy of cam movement is permissible. Therefore, the mechanical linkage including the Bowden wires 41 and 42 and the racks and pinions 74, 75 and 76 may operate with reasonable mechanical accuracy and yet provide a highly precise positioning of the inner carriage. By the use of the Bowden wires 41 and 42, the cam 71 may be positioned by means 33 remote from the transport carriage 13; and therefore, the drive means will not add to the weight of the transport carriage.

The plates 59 and 60 of the inner carriage are formed with spaced apart arcuate grooves 89 and 90 which are dimensioned to receive and hold a film strip 12. When the transport carriage 13 is positioned and caged upon a selected cell 21, and when the inner carriage is positioned for selection of a film strip 12, then the arcuate grooves or guideways 89 and 90 become aligned with a selected one of the guideways 22 of the cells 21 containing the film strip being selected.

A pickup arm 83 having a pair of jaws 84 may be moved to engage and remove the selected film strip from selected cell into the guideways 89 and 90. The arm 83 is fixed to a shaft 85 which extends between and is rotatably mounted in the plates 59 and 60 of the inner carriage. The arm 83 is driven by the pair of Bowden wires 43 and 44 which connect to opposed spaced racks 86 and 87 engaging a pinion 88 fixed to the shaft 85. Therefore, it is seen that opposite movement of the Bowden wires 43 and 44 will cause rotation of the pinion 88 and of the pickup arm 83.

The guideways 89 and 90 are circular about the shaft 85 as a center and have a radius such that the jaws 84 of the pickup arm 83 will always move between the opposed spaced guideways 89 and 90. Thus, the pickup arm 83 may be rotated clockwise (as shown in FIG. 3) thereby carrying the jaws 84 to a position for grasping the selected film strip 12, thence the jaws 84 are closed and the pickup arm 83 may be rotated counter-clockwise to pull the film strip from the cell 21 into the guideways 89 and 90 where it is held while being transported to the read/write station. The jaws 84 are operated by a mechanical linkage which includes the Bowden wire 45 and a bell crank 92 connected thereto and pivotally supported in backets 93 on the plate 60 of the inner carriage. Vertical movement of the Bowden wire 45 causes the lower extremity of the bell crank 92 to move horizontally whereupon a pin 94 is withdrawn from or inserted into a cavity within the shaft 85. The pin 94 constitutes a cam for moving a push rod (not shown) within the arm 83 to open and close the jaws 84. Therefore, the jaws 84 may be operated through the mechanical linkage including the Bowden wire 45 by a drive means remote from the carriage 16.

In a data storage arrangement, it is desirable to minimize the "access time" required for selecting and transporting a particular record from the storage file to the read/write station and return. In the present machine, the several steps required for selecting a particular film strip comprise (1) moving the transport carriage to a selected location over a particular drawer 23, (2) moving the selected drawer to present a selected cell 21 in spaced relation with the transport carriage 13, (3) moving the inner carriage with respect to the outer carriage to select a particular film strip from the selected cell, and (4) moving the pickup arm 83 of the inner carriage to permit the jaws 84 to engage the selected film strip. Because of the arrangement of the various parts of this machine, it is not necessary that the four enumerated steps be accomplished in sequence. Indeed, a minimum access time may be attained if all of the various drive mechanisms 29, 30, 32 and 33 be operated simultaneously. Thus, during the time while the selected drawer 23 is being moved and positioned, the transport carriage 13 likewise moves to that selected drawer, the inner carriage moves in preparation to select a particular film strip, and the pickup arm moves to a ready position for picking up the selected film strip. Then, as soon as the caging detent 67 is driven "home" to lock the inner carriage to the selected cell 21, the pickup arm 83 and jaws 84 can quickly grasp and remove the selected film strip 12 from the cell for transport to the read/write station.

Read/write station

When the selected film strip 12 has been removed from the cell 21 by the pickup arms 83, the caging detent 67 is withdrawn from the cell 21 and the transport carriage 13 is moved to the read/write station 14. During the travel of the transport carriage 13, the inner carriage likewise moves to a "home" position with respect to the outer carriage, and as the transport carriage 13 is positioned at the read/write station the caging detent 67 may be lowered to engage a lip 97 (see FIG. 1) whereupon the slotted guideways 89 and 90 of the inner carriage will become aligned with a similarly dimensioned slotted guideway 98 at the read/write station. The pickup arm 83 of the inner carriage may again move clockwise (as viewed in FIG. 3), and the film strip 12 will be transferred to the slotted guideway which forms a part of a film strip holder 99. The film strip holder 99 with the film 12 therein is positionable along two perpendicular axes such that a selected portion of the film strip may be presented in alignment with the optical systems 15 and 18.

Figure 4:
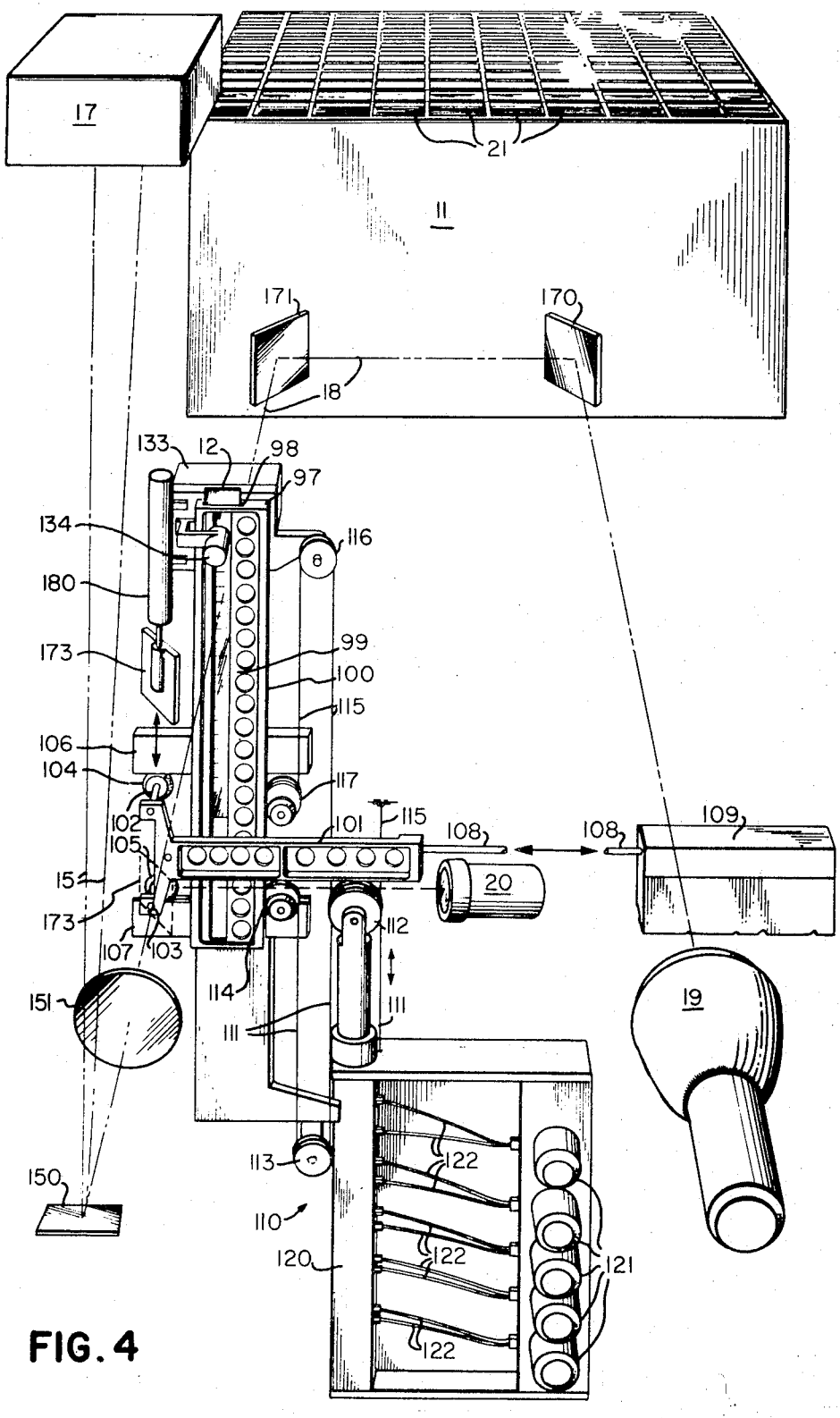
FIG. 4 is a perspective view of the "read/write" station of the machine of this invention showing the film holding and positioning mechanisms and the optical systems.

As shown in FIG. 4, the film strip holder 99 is mounted to slide vertically or along a Y-axis within an outer frame 100 which is a part of a carriage 101 which is movable along a horizontal or X-axis. The carriage 101 is supported at one end by axles 102 and 103 carrying supporting rollers 104 and 105 which in turn may move along a pair of vertically spaced apart fixed rails 106 and 107. The carriage 101 may be positioned in an X direction by a directly connected push rod 108 coupled to a hydraulic positioning device 109. The film holder 99 may be moved in a Y direction by another hydraulic positioning device 110 through a mechanical coupling which includes a first cable 111 trained about pulleys 112, 113 and 114, and a second cable 115 trained about the pulley 112 and further pulleys 116 and 117. The pulley 112 constitutes the drive member, and if moved upwardly, would cause the cable 115 to slacken while the cable 111 would tighten. Cable 111 would thence exert a force around the pulley 114 and would cause the film strip holder 99 to be raised; conversely, if the pulley 112 were driven downwardly the cable 115 would be tightened and the film strip holder 99 would be caused to move downwardly. The cable pulley drive arrangement functions to double the increment of displacement provided by the hydraulic device 110.

The hydraulic drive means 109 and 110 are similar in their structure and operation to each other and to the various drive mechanisms 32 and 33. The drive mechanism 110, for example, includes a series of cylinder-piston combinations tandemly coupled together and aligned within a guideway 120. Each cylinder has associated therewith a solenoid operated control valve 121 hydraulically coupled to pass fluid under pressure to a selected end of each cylinder, and to exhaust fluid from the other end through flexible conduits 122. Since each piston is coupled mechanically to move the next succeeding cylinder and all of the cylinders thereafter, the total positioning displacement is equal to the individual sums of the displacement of each of the cylinders. The various cylinders may be binary coded such that the second piston is displaceable by twice the amount of the first piston, the third piston is displaceable by four times the amount of the first, the fourth is displaceable by an amount of eight times that of the first, and the final piston is displaceable by an amount equal to sixteen times the displacement of the first. By selectively operating the solenoid valves 121 associated with the five binary coded cylinders, the drive pulley 112 and the film strip holder 99 may be moved to any one of thirty-two possible positions. Obviously, further positions would be obtainable by the use of additional cylinder piston combinations.

Data arrangement on the film strips

As best shown in FIG. 5, each film strip 12 is divided along its length into sectors 124, and each sector includes a number of lines of data 125. Each line of data is photographically impressed upon the film strip by a recording or writing operation. Thus, when it is desired to update or write further data into the photographic file of this invention, the selected film strip is moved along the vertical or Y-axis in the read/write station until a selected one of the sectors 124 is aligned with the optical systems 15 and 18, and the film strip is further moved horizontally along an X-axis to the last recorded line of that sector, whereupon a further line of data may be photographically added to the lines previously recorded. If it is desired to reproduce the recorded information, the film strip is positioned along the Y-axis to the desired sector and thence is positioned along the X-axis to the final line of data whereupon the most recently recorded data of a particular account may be reproduced.

The manner in which data is recorded in lines may be best understood with reference to FIG. 7. Each of the lines 125 includes a centrally disposed guide bar 126 with data in binary coded bits extending in a tooth-like manner from each side of the central bar 126. A first portion of each line 125, the upper ends as shown in FIG. 7, have no data recorded thereon and the center bar constitutes a reference marker. Thus, a scanning spot 127 would be first located with respect to the center bar 126 at a beginning end where no data is recorded. The spot 127 may then be caused to scan (vertically as shown in FIG. 7) along one side of the center bar 126 to sense the various binary bits extending thereupon. The spot 127 first intercepts a start bar 128 which does not constitute any of the stored data, but merely functions to generate a starting pulse in a self-clocking circuit for interpreting the scanned data. Thus, the start bar 128 establishes a reference time enabling a clocking oscillator (not shown) to determine whether the remaining bits of information are "1's" or "0's." For example, assuming the spot 127 were to scan downwardly along the right side of the left line 125 as shown in FIG. 7, the first bit 128 would not be reproduced but would function merely to start the clocking or synchronizing operation and the first identifiable bit of information would be the second bar 129 which would register as a binary 1. Thus, starting with the bit 129 and continuing the spot 127 would interpret the data in binary form to be "1010110010110 . . . " since the lines depicted in FIG. 7 are broken away to show only the initial or starting ends, the spot 27 would continue and would reproduce further binary information throughout the remaining length of the line which is not shown.

The last line detector

As previously stated, the film holder moves along the Y direction to a selected sector, and along an X direction to the last line of that sector. FIG. 5 illustrates an arrangement for determining the number of previously recorded lines which are present in any selected sector of the film strip to facilitate the positioning of the film strip in the X direction. The film strip 12 is being lowered as indicated by an arrow 130 into the film strip guides 98 by the jaws 84 of the pickup arm of the transport carriage 13. A scanning disc 131 is rotated on a shaft 132 in synchronism with the downward movement of the film strip 12. A light source 133 is positioned on one side of the disc 131 and film strip 12, and a photocell 134 is positioned on the other side thereof. The disc 131 contains a plurality of scanning slits 135 corresponding in number to the number of sectors 124 on each of the film strips 12. As the film strip moves into position in the read/write station, the disc 131 makes one revolution whereupon each successive sector 124 of the film strip is scanned transversely by a beam of light 136 emanating from the successive slits 135 of the disc 131.

The beam of light 136 having scanned through the lines of each sector 124 is received by the photocell 134 which generates a number of voltage pulses corresponding to the number of lines intercepted. As shown in FIG. 7, the light beam 136 is caused to scan across the end portions of the lines where no bit information has been recorded and only the central bar 126 appears; and therefore, the generated voltage pulses will be of uniform duration and spacing to facilitate accurate counting. The voltage pulses thus generated are amplified in an amplifier 138 and are then passed to an AND gate 139.

Associated with the scanning disc 131 is provided a means for detecting which sector 134 of the film strip 12 is currently being scanned by the disc 131. Such means may comprise a commutator 140 mounted to rotate synchronously with disc 131. Varvious conducting bars 141 are spaced to angularly correspond to the various slits 135 and to make electrical contact with brushes 142 during those scanning times. A multi-position switch 143 may be preset according to the particular sector 124 which has been selected. The combination of the commutator 140 and the switch 143 may produce an electrical signal on a lead 144 only during the scanning time of the selected sector 124. The electrical signal thus produced is passed to the AND gate 139 and constitutes a control signal for opening the gate for the passage of the voltage pulses from the amplifier 138 only during the time when the selected sector is being scanned. An address register or counter 145 is coupled to receive the pulses passed by the AND circuit 139. The pulses counted by the register 145 provide the necessary address information which may be supplied to the solenoid valves of the positioning device 109 and which will thereby cause the film strip holder 99 with the film strip 12 therein to be moved along the X-axis in accordance to the number of previously recorded lines of data appearing in the selected sector.

The use of the last line detecting means described above permits the use of a shorter and simpler "address signal" then would otherwise be possible. The address signal is used to cause the various postioning mechanisms 29, 30, 32, 33 and 110 to move for selection of a drawer 23, a cell 21, a film strip 12 and a sector 124 of the film strip. However, no prior address information need be passed to the mechanism 109, since the last line detecting means 131 through 145 provides this information during the time the film strip moves into the read/write station 14.

Optical system for recording data

As shown in FIG. 1, the first optical system 15 includes the lamp or other source of radiant energy 16, the matrix of aligned shutters 17 which produces a silhouette image representative of the data to be recorded, a mirror 150 and a lens 151 positioned to focus the image reflected from the mirror 150 onto a portion of the film strip 12 held in the film strip carrier 99. The film strip 12 has been made sensitive to ultra-violet radiation and insensitive to visible light in accordance with the teachings of U.S. Patent 2,528,496. The lamp 16 comprises an electrical discharge tube operable primarily to generate a shortwave length ultra-violet radiation, although, in practice, this lamp may also generate considerable visible light and radiation of other spectral frequencies. An important advantage is gained by the use of ultraviolet radiation for recording data upon a film strip which is not appreciably sensitive to visible light since the film strip need not be further processed or "fixed," since it will not be exposed to such shortwave length ultraviolet radiation except when positioned in the read/write station 14 during the process of recording data. Therefore, the image photographically impinged upon the film strip 12 will remain unaltered during long periods of storage, and will even remain unaltered if manually removed from the storage cell 21 for inspection or for further storage apart from the data processing machine of this invention.

Although the focusing device 151 has been previously described as a lens, it has been found that ultraviolet radiation can be more efficiently passed through a pair of spherical mirrors without substantial energy loss due to absorbtion. Since the shortwave length ultraviolet radiation is not efficiently refracted, the reflection method of focusing using the mirrors is more practical. However, the double mirror arrangement functions as if it were a simple lens, and therefore, it may be so considered. An advantage gained in optical recording of this sort lies in the fact that an image bearing the data to be recorded may be formed from elements of conventional size; and, this image may be optically reduced to a miniature of the original to effect a saving of space in the storage media. Thus, the recorded lines of data may be much smaller than the shutter matrix 17 from which they were derived.

The shutter matrix 17 is best shown in FIG. 6, and comprises generally a plurality of individually operated shutters 153 aligned side by side and extend parallel with the lamp 16 which is backed by a reflective shield 154. Each of the shutters 153 is mounted to slide toward or from a spaced central opening slit 155. Each of the toothlike shutters 153 is moved in accordance with the data or binary bit information to be recorded, and therefore, selected ones of the shutters 153 will be closed to partially block the radiation from the lamp 16 while others of the shutters will remain open to permit bits of radiation to pass therethrough for forming a data image upon the film strip. The arrangement of the shutters 153 will produce an image of the ultraviolet radiation corresponding in form to the lines of data shown in FIG. 7. It may be noted that shutters at one end 156 of the matrix will remain permanently closed to form a starting end of the image with no data recorded thereon. Indeed, it is not necessary to provide operative shutters at the end 156, nor is it necessary to provide operative shutters at 157 which must be permanently opened to record a starting bit 128 on each line of data.

Each of the operative shutters 153 may be driven to either of the two binary positions by an electro-strictive element 158 which is mechanically coupled to move the shutters by a means such as a thin flexible wire 159 connected therebetween. FIG. 8 illustrates one of the electrostrictive elements 158 which comprises a thin wafer-like strip 160 composed of a piezoelectric or electrostrictive material such as barium titanate. The barium titanate strip 160 exhibits the property of bending or deforming when placed in an electric field. Such an electric field may be provided if opposite faces of the barium titanate strip are rendered electrically conductive such that an electrical condenser is formed having two conductive plates with the barium titanate constituting a dielectric material therebetween. As shown in FIG. 8, the barium titanate strip 160 may be bonded on one side to a flexible metallic backing 161 which forms one of the plates of the condenser. The opposite side of the barium titanate strip 160 is rendered electrical conductive by the application of a metallic coating 162. Electrical connections 163 are made to the metal backing strip 161 and to the conductive coating 162 such that a voltage may be applied across the barium titanate strip 160. The mechanical coupling wire 159 may likewise be bonded to the extreme end of the metal backing strip 161 or to the end of the barium titanate strip 160. When the electrostrictive element 158 is assembled, as shown in FIG. 8, a direct voltage will cause the element to bend or deform as indicated by the dashed line 164.

In addition to functioning as a simple drive element for the respective shutters 153, each of the electrostrictive elements may be further used as a buffer memory device for the temporary storage of the data which will subsequently be stored permanently on the film strip 12. To fully understand the use of the electrostrictive element as a buffer storage device, it must be appreciated that in an electrical circuit the device acts as a condenser or capacitor having two electrically conductive plates with an insulating medium therebetween. If this capacitor is charged by a voltage pulse, and is then isolated from other electrical circuitry, the capacitor will hold its charge and continue to maintain the voltage across its plates for a substantial time interval. Thus, if the various electrostrictive elements 158 are selectively pulsed with voltages, the selected elements will deform and will so remain until a recording operation has been completed and the data permanently impressed upon the film strips. Subsequent to the recording operation all of the electrostrictive elements 158 may be short circuited whereupon they will all be returned uniformly to an undeformed condition ready for the next recording operation.

The electrostrictive elements 158 which are used in the data recording machine of this invention, are available commercially, and are fully disclosed in U.S. Patent No. 2,924,981.

As shown in FIG. 6, the shutter matrix is arranged in a housing 166 which housing also encloses the electrostrictive elements 158 which may be mounted side by side on a single bracket 167. Further electrostrictive elements (not shown) may be arranged on the other side of the housing 166 to selectively operate the other line of shutters 153. The ultraviolet radiation from the lamp 16 will pass through the shutter matrix forming an image which will be carried through a slotted opening 168 disposed beneath the shutters 153 at the bottom of the housing 166. The electrostrictive elements 158 therefore extend upwardly in two rows to the shutter matrix. An obvious alternative would be to place the lamp 16 between the two rows of electrostrictive elements 158 and within the housing 166. This arrangement would conserve space, however, the feasibility is doubtful since the lamp 16 may generate considerable heat, and it may be desirable to shield the electrostrictive elements 158 and the connecting wires 159 from the heat so generated. By placing the lamp 16 apart from the electrostrictive elements as shown in FIG. 6, a cooling system (not shown) may be provided wherein forced air may flow past the lamp 16.

*Optical systems for reproducing data*

As shown in FIGS. 1 and 4, the data reproducing or read system includes a cathode ray tube 19 of conventional design having an internal electron beam which scans across a face plate and produces a spot of visible light on a fluorescent surface thereon. The scanning spot thus developed is focused upon the film strip 12 in the film strip holder 99 by a pair of fixed mirrors 170 and 171 and a lens 172. The scanning spot will pass through the transparent film strip 12 and be further reflected by a positionable mirror 173, and be ultimately received by the photocell 20. The photocell 20 is operable to develop a fluctuating voltage representative of the data scanned by the spot of light from the cathode ray tube 19 as it passes along a scanning line 125 of the film strip.

By making use of a "captured spot technique" described in U.S. Patent No. 2,540,016, it is possible to cause the scanning spot to trace a proper course along a line of data without providing a high accuracy mechanical means for positioning the film strip 12 along the X and the Y axes with respect to the alignment of the optical system 18. As taught in the above cited patent, a spot of light may be partially eclipsed by an opaque line and thereby reduced in brilliance. A photoelectric pickup from such spot will develop a reduced voltage corresponding to the degree of eclipsing of the spot. This voltage developed by the photoelectric cell 20 may be fed back to control the deflection circuit associated with the cathode ray tube 19 such that the positioning of the spot is controlled by the line which it scans.

This scanning technique may be best understood with reference to FIG. 7. An initial positioning 175 of the scanning spot is determined mechanically by the X and Y positioning devices 109 and 110. Initially the spot may appear adjacent to but not necessarily on a line of data to be scanned as indicated at 175. The spot is thence caused to scan toward the selected start line 126' as indicated by an arrow 176. When the spot intercepts the line 126', the brilliance of the spot is diminished and the scanning in the direction of the arrow 176 is terminated. The spot is then caused to scan at right angles in the direction of an arrow 177 to intercept the start bit 128 and the successive information bits that follow. As shown by FIGS. 6 and 7, data may be recorded on either or both sides of the center bar 126'. Should it be desired to reproduce data appearing on the opposite side of the center line 126', the scanning spot must be initially positioned there and caused to initially move oppositely from the direction of the arrow 176. However, the logic in reproducing information from the opposite side of the line 126' is the same as previously discussed. By using the captured spot technique, either side of a line of data may be properly scanned, even though the initial positioning of the spot 175 was not particularly accurate.

As shown in FIG. 1, the mirror 173 is positionable as indicated by the double arrow 179. During a read cycle, when data is being reproduced by the optical system 18, the mirror is necessary in the position shown to focus the scanning spot upon the photocell 20. On the other hand, during a writing operation when data is being recorded upon the film strip 12, the position of the mirror 173 would interfere with the optical system 15. Therefore, a means such as a solenoid 180 is provided for raising and lowering the mirror 173 dependent upon whether the operation to be performed is that of recording or reproducing data.

In a normal recording and/or reproducing operation of the data storage machine of this invention, a film strip 12 is selected from a particular cell 21 of a particular drawer 23 and is transported by the carriage 13 to the read/write station 14. Upon completion of the operation, the film strip is returned from the read/write station to the same cell of the same drawer by the same transport carriage 13. Other alternative embodiments of this invention could provide multiple access to the file 11 for more than one read/write station. It would be an obvious extension of this invention to extend the rails 25 and 26 (in either direction) such that the same transport carriage 13 and the same file 11 could serve two or more read/write stations. Another obvious extension of this invention would be to provide another transport carriage movable on another pair of rails to supply a further read/write station from the same file 11. Although certain interlocks would be required to prevent both transport carriages from attempting to position over the same drawer 23, great advantage may be gained in decreasing the waiting and access times for retrieving information from the file 11. If the machine were provided with multiple access having at least two read/write stations, then a film strip which has filled sectors of information with no more room thereon, could be updated and replaced by a new film strip. Thus, the last line of information could be reproduced from a filled film strip in one of the read/write stations and could be re-recorded on a fresh film strip in the other read/write station.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device wherein optical data is stored in lines in a plurality of sectors on a record sheet, apparatus for counting recorded lines of a selected sector of the record sheet, said apparatus comprising:
   means for moving the record sheet to pass the sectors in sequence through a detecting station,
   means for generating sequentially spots of light,
   scanning means synchronized with the movement of the record sheet for causing each sequential spot to scan across respective sectors of the record sheet,
   electrical means positioned to sense the scanned spot and operable to develop a voltage pulse for each of said intercepted lines of data,
   gating means synchronized with the movement of the record sheet and electrically coupled to pass the voltage pulses from the electrical means,
   said gating means being operable to pass voltage pulses to the counting means only when a selected one of the sectors of the record sheet is in optical association with the spot generating means and the electrical means, and
   counting means coupled to receive the voltage pulses from the gating means.

2. In a device wherein optical data is stored in lines in a plurality of sectors on a record sheet, apparatus for selecting a desired sector and counting lines recorded therein, said apparatus comprising:
   means for moving the record sheet to pass the sectors in sequence through a detecting station,
   means for generating sequentially spots of light,
   scanning means synchronized with the movement of the record sheet for causing each sequential spot to scan across respective sectors of the record sheet,
   electrical means positioned to sense the scanned spot and operable to develop a voltage pulse for each of said intercepted lines of data,
   a commutator connected to said spot generating means,
   a multi-position switch electrically connected to said commutator,
   a gate electrically connected to both said multi-position switch and to said electrical means, and
   counting means connected to said gate.

3. The apparatus of claim 2 wherein the spot generating means comprises a rotatable slitted disk and light source.

References Cited

UNITED STATES PATENTS 2,401,021  5/1946  Rosenberg et al.
3,146,341  8/1964  Maloney et al.

MAYNARD R. WILBUR, *Primary Examiner.*

T. J. SLOYAN, *Assistant Examiner.*

U.S. Cl. X.R.

250—219